Figure 11:
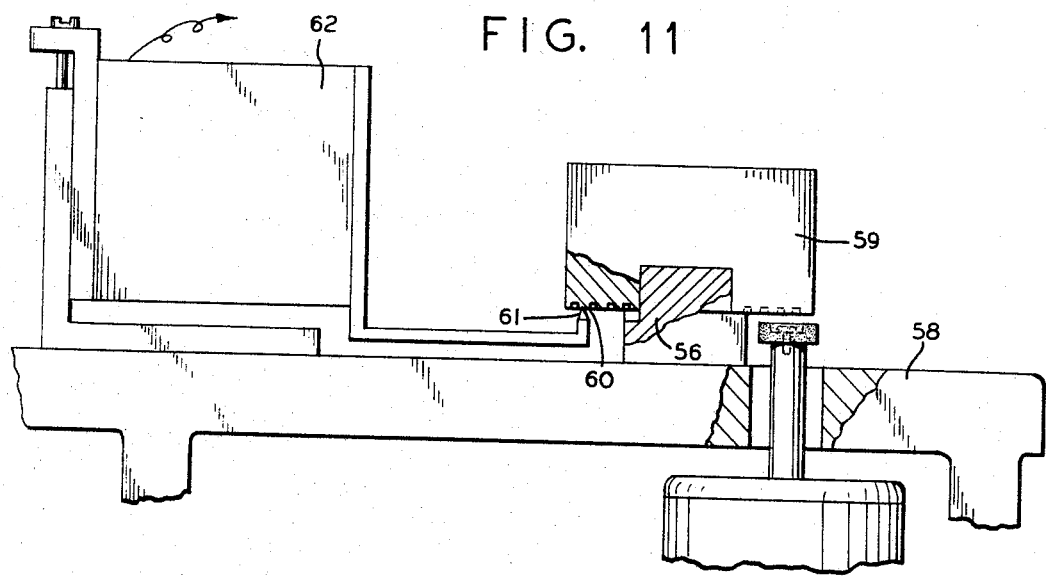

July 11, 1967     F. H. RAE     3,330,634
METHOD OF PRELOAD GRINDING OF DUPLEX BALL BEARINGS
Filed July 15, 1964     3 Sheets-Sheet 1
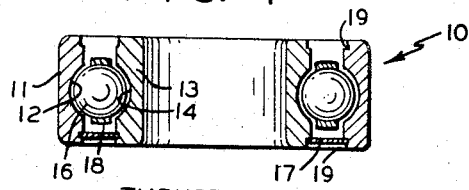
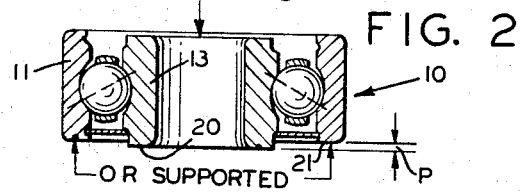
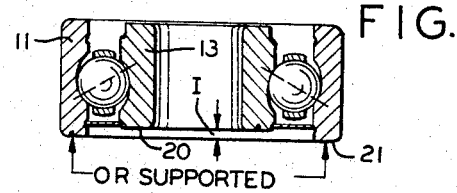
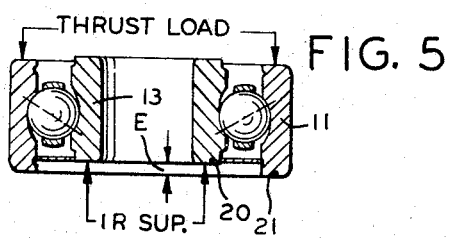
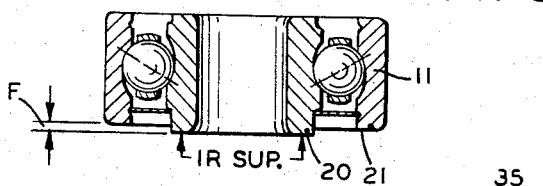
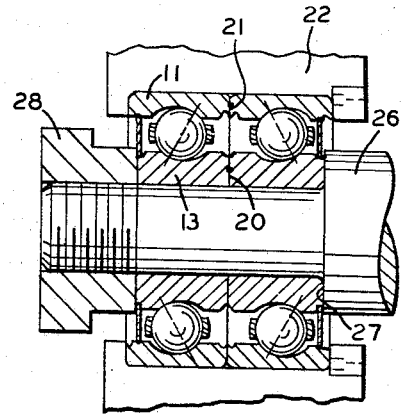
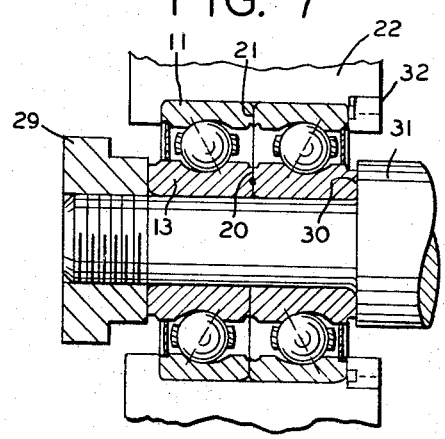
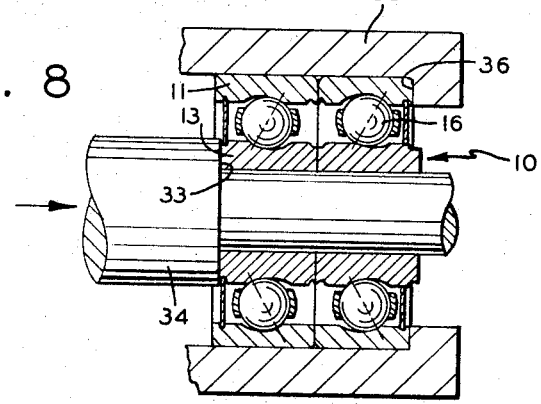
INVENTOR.
FRANK H. RAE
BY John P. Chandler
HIS ATTORNEY.

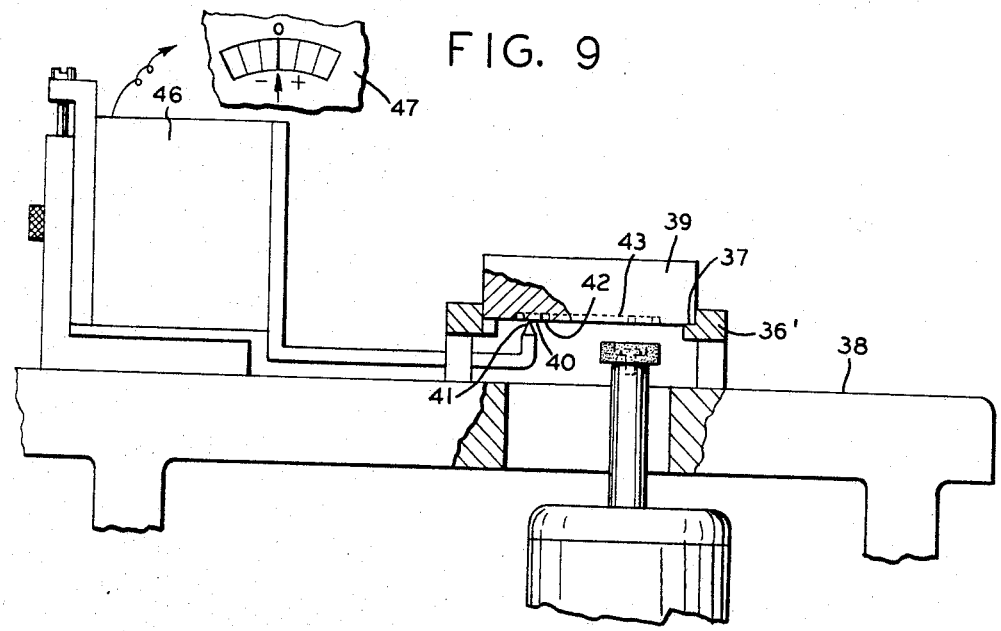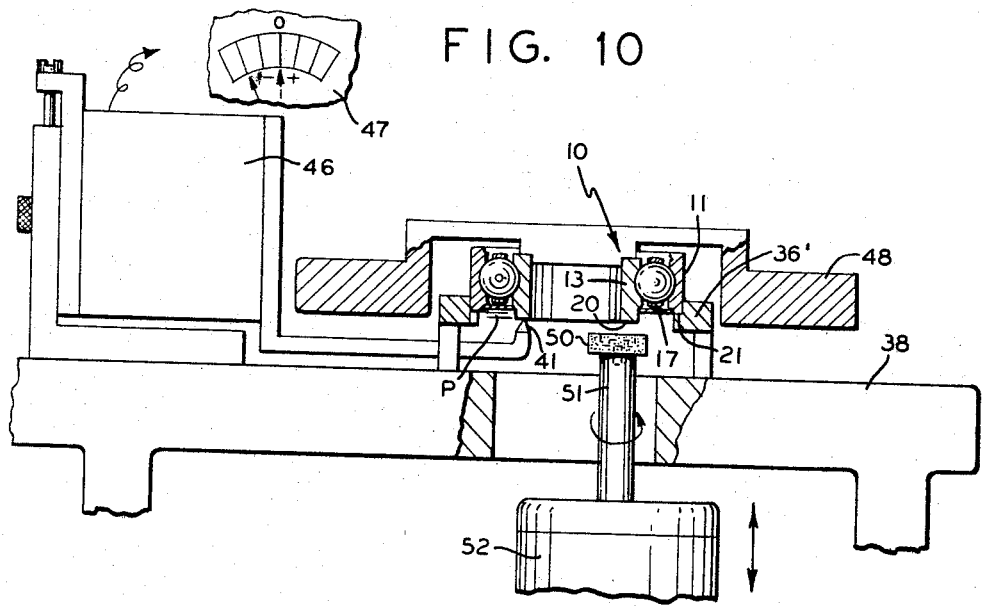

INVENTOR.
FRANK H. RAE
BY John P. Chandler
HIS ATTORNEY.

United States Patent Office 3,330,634
Patented July 11, 1967

3,330,634
METHOD OF PRELOAD GRINDING OF DUPLEX BALL BEARINGS
Frank H. Rae, Darien, Conn., assignor to Norma-Hoffmann Bearing Company, a division of Universal American Corporation, Stamford, Conn.
Filed July 15, 1964, Ser. No. 382,706
6 Claims. (Cl. 51—291)

This invention describes a new, simplified and unique method for grinding the faces of ball bearings including angular contact (AC) bearings to provide duplex back to back (DB), duplex face to face (DF) and duplex tandem (DT) mounting. These bearings are all assembled with a plurality of balls and usually with a retainer or ball separator. The improved method of the present invention performs these grinding operations on a completely assembled bearing while one only of the rings of the bearing is under rotation and under a thrust load and thus, to a considerable degree, simulates operating conditions.

Usual methods for doing this work generally consist of making a trial assembly on a partially assembled bearing, making the required measurements, disassembling the bearing, performing the necessary grinding operation on the component ring or rings, remaking the partial assembly and checking measurements; a minimum of six distinct operations.

Not only must these operations be sequentially performed but the bearings must be moved from one area where the measuring operations are performed to another area where the grinding is done. The measuring must be performed on a perfectly flat horizontal surface where the extent of protrusion of one ring relative to the other, while one of the rings is under a thrust load, is carefully measured by sliding a delicate indicator over the flat surface and under the assembled bearing mounted above but precisely parallel with the flat surface. The difference between the planes of the inner and outer rings is thus read. The bearing is next disassembled and removed to the grinding machine where the required amount and no more is removed. More often than not, however, the grinding has proceeded too far or not far enough.

In another method, the completed bearing may be rigidly locked in a loading device, preventing rotation of the balls and races and the bearing faces ground as a locked assembly. The principal object of the present invention is to provide a method which avoids these costly assembly and disassembly operations and the inherent inaccuracies of the locked bearing technique. The methods of the present invention produce bearings ground for either DB or DF applications, or the same bearing may be ground for both types of applications, with a greater accuracy than with conventional methods and the cost is considerably lower.

The method of the present invention is made possible by the use of seals, generally made of rubber and having some type of metal reinforcement imbedded therein, and of the type which are mounted in an annular recess in the outer ring and have a central annular section providing a rubbing contact with a diagonal shoulder on the inner ring. This seal is to be distinguished from a metal seal mounted in the outer ring and having a slight clearance, almost touching the inner ring.

In the past, preload grinding has never been done in a satisfactory fashion on assembled bearings with rotation of the ring being ground, for the reason that grinding grit and swarf ruin the surfaces of the balls and races. Also, in virtually every preload grinding process in use in the past, with the exception of that described in Anderson Patent No. 2,972,841, there was never any positive indication when to stop the grinding. If insufficient material was removed from the ring, it could be replaced in the chuck for further grinding and the only thing lost was the time.

The process of the present invention is the first one wherein it is virtually impossible to remove either too much or too little stock.

Figure 12:
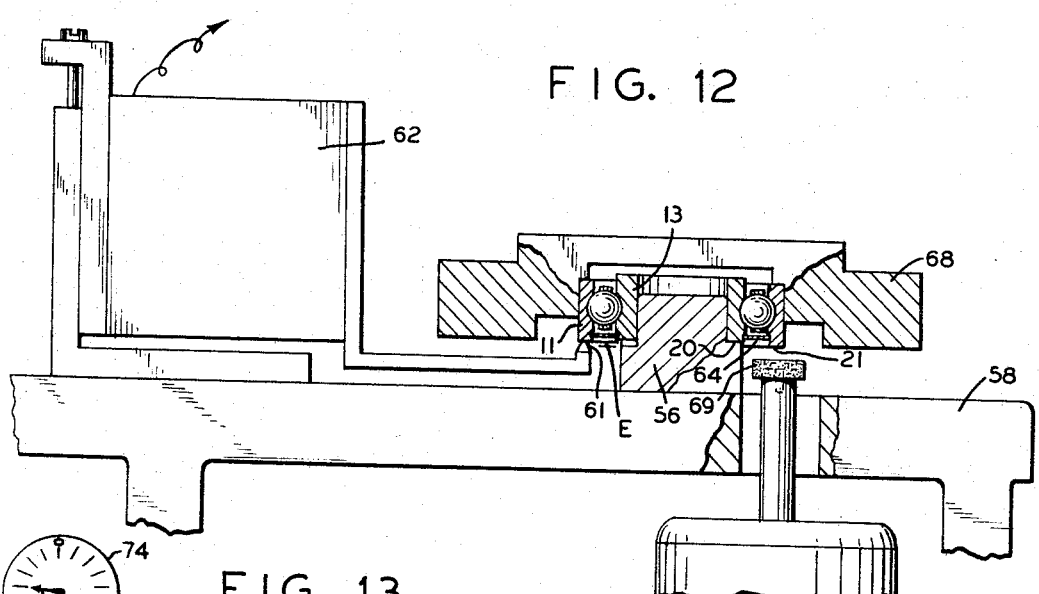
Figure 13:
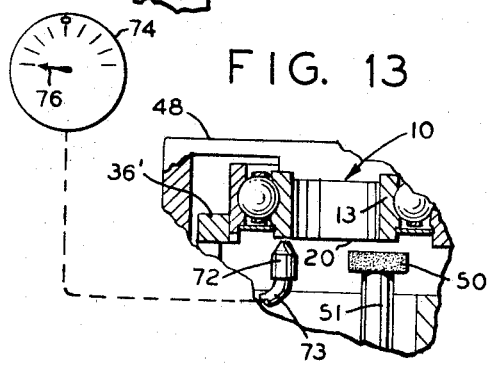

In the drawings:

FIG. 1 is a section taken through a conventional ball bearing under condiitons of no load;
FIG. 2 shows the bearing of FIG. 1 with a specific axial thrust load applied thereto;
FIG. 3 shows the bearing of FIG. 2 after the lower face of the inner ring has been ground flush with the lower face of the outer ring and the thrust load has been released;
FIG. 4 illustrates the mounting of bearings of FIG. 3 in DB relaiton;
FIG. 5 shows the bearing of FIG. 1 with a thrust load applied axially to the outer ring ready for the grinding operation;
FIG. 6 shows the bearing with the grinding completed and after the thrust load has been released;
FIG. 7 shows the bearings mounted on a shaft in DF relation;
FIG. 8 shows the same bearings in DT relation;
FIG. 9 shows the apparatus used for establishing the reference plane for the outer ring in the DB preload grinding operation;
FIG. 10 shows the same apparatus with the assembled bearing in position for the grinding operation;
FIG. 11 is similar to FIG. 9 but with the apparatus for establishing a reference plane for the inner ring in the DF preload grinding operation;
FIG. 12 shows the assembly bearing ready for the DF preload grinding operation;
FIG. 13 is a schematic showing of an air jet or other non-contacting member for the work piece set up for DB preload grinding.

A conventional bearing 10 before preload grinding and under conditions of no loading, shown in FIG. 1, has an outer ring 11 with a ball race 12, an inner ring 13 with a ball race 14, and a complement of balls 16 positioned in the races. The balls are maintained in equally spaced relation by a separator 18. Each ring has a recess 19 at each end thereof to receive a removable seal 17. The drawing shows the rings to be of equal widths but the invention is not limited to this arrangement since bearings with unequal inner and outer ring widths can be processed in accordance with the present invention with equal facility provided the faces to be ground are reasonably flush. FIG. 1 further shows the centers of the balls and the raceway curvatures to lie in the same plane.

Under the first condition for DB mounting, the bearing 10 of FIG. 1 is shown in FIG. 2 with a specified thrust load applied axially to the inner ring (IR) 13. Under this axial load, the face 20 of the inner ring shifts and may protrude a distance P beyond face 21 of the outer ring (OR). While the outer ring is held rigidly, the inner ring is rotated, in accordance with the present invention, and stock is simultaneously ground off the face 20 of the inner ring until the inner ring face 20 is flush with the outer ring face 21.

FIG. 3 shows the condition of the bearing after the grinding of face 20 of the inner ring when the specified axial thrust load is removed and the bearing is under zero axial thrust load. The inner ring face 20 will now be observed to have an intrusion distance I with respect to outer ring face 21. This intrusion I is produced by the "spring-back" of the inner ring due to the release of the metallic elastic deflection of the balls and rings as the axial thrust load is removed.

Consider now that two similar bearings 10 ground as described above under the same axial inner ring thrust load have their outer rings 11 tightly mounted in a housing 22, as shown in FIG. 4, with the inner rings 13 mounted on shaft 26 and the faces 21 and 20 of each bearing facing each other. Faces 21 are in contact with each other and faces 20 are initially separated. When the nut 28 is screwed against one inner ring 13, and the other inner ring contacts a shoulder 27 of shaft 26, the instrusion I of each inner ring 13 is reduced to zero. Under these conditions, the faces 20 will abut and the bearings will be preload mounted under the conditions of DB mounting.

FIGURES 5, 6 and 7 illustrate the steps in producing and mounting DF preloaded bearings. The inner ring 13 is supported, as shown in FIG. 5, and a specified axial thrust load applied to the outer ring. It will be noted that this time the outer ring face 21 shifts and may show a protrusion distance E beyond the inner ring face 20. It will now be considered that the inner ring is supported and the outer ring rotated while simultaneously grinding stock off the outer ring face 21 until face 21 is flush with inner ring face 20.

The thrust load is removed from outer ring 11 and it will be observed (FIG. 6) that outer ring face 21 now has an instrusion distance F with respect to inner ring face 20. This intrusion is produced by the spring-back due to the elastic deformation produced in the balls and rings by the axial thrust load on the outer ring.

Two similar bearings ground as above under the same thrust load are now mounted with the inner rings on a shaft 31 and a nut 29 secures these rings tightly against a shoulder 30 of shaft 31 as shown in FIG. 7. Note that faces 21 and 20 of each bearing face each other. The outer rings are disposed in a housing 22. When the housing nut 32 is tightened the faces 21 will approach each other and the intrusion F will be reduced to zero, thus consummating the requirements of the face to face or DF preload assembly.

FIGURE 8 illustrates the condition of DT mounting where preload ground bearings are paired in tandem to provide for maximum thrust-carrying capacity in one direction. One of the inner rings 13 of a pair of the preload ground bearings 10 engages a shoulder 33 on a shaft 34 and their outer rings 11 are mounted in a housing 35 against a shoulder 36.

It should be noted that for the purposes of clarity, the illustrations given for DB and DF assembly specified grinding the faces of the bearings to flushness under the specified thrust load and that an initial protrusion was assumed. In practice, any protrusion or intrusion as well as "flushness" of the faces can be ground, which, with the correct thrust load applied during grinding, will give the required DB or DF preload in the application. In other words, specific gaging thrust loads are used for the grinding operation with specifications written for intrusion or protrusion of the faces under the gage loads that will result in the desired preloading of the bearings in the application. Both DB and DF grinding may be applied to the same bearing for universal application in DB, DF or DT installations.

FIGURES 9 and 10 illustrate the novel apparatus used for DB preload grinding as discussed for DB assembly. In FIG. 9 is shown the calibrating method used to measure the displacement of the bearing faces. In this figure, there is shown a precision chuck 36' with three equally spaced supports 37 provided for the face 21 of the bearing outer ring. If desired, more than three supports may be employed. The inside diameter (ID) of the chuck closely conforms to the outside diameter (OD) of the bearing to be ground. This chuck is mounted in a horizontal position on fixture 38. 39 is a body known in the precision machining art as a setting gage or "maser flat" of approximately the same mass as the sum of the entire bearing and load weights of FIG. 10. This setting gage is rpovided with a precision flat under surface 40. 41 is any suitable contacting member or probe. This contacting member can be replaced by some non-contacting arrangement such as an open air jet or other means such as a proximity gage for sensing the location of the precision flat surface at the location corresponding to the face 20 of the inner ring 13 shown in FIG. 10. Coupled to contacting member 41 is a suitable transducer 46 having indicating means at 47 to show the location of the precision flat surface 40 on an appropriate scale. The transducer is mounted on fixture 38. It will be noted that the master flat has two annular recesses 42 and 43 and the area therebetween is that occupied by the face of the inner ring 13 when the bearing is placed in the chuck. The point of the indicating member should contact the inner ring precisely in the center.

To set up for operation, the setting gage 39 is seated at 37 in the precision chuck and the transducer and/or indicating meter adjusted to read zero. This now establishes the reference plane of face 21 of the bearing outer ring 11 at zero.

Referring to FIG. 10, a bearing assembled with the removable rubber seal 17, earlier mentioned, is placed in the precision chuck as shown with the seal side down. Most bearings are made with annular recesses on both sides of the outer rings so that a seal can be placed on either face. This seal next to the grinding wheel guards against the entrance of grinding grit and debris. A thrust loading mass 48 designed to centrally load the inner ring 13 is now placed in position on the upper face of the inner ring. This produces a displacement P of the inner ring face 20 with respect to the outer ring face 21. This displacement P is shown on the scale of the indicating meter. The mass 48 is now rotated and provides sufficient energy to rotate the inner ring and balls and present a continuous inner ring face as a rotating grinding wheel 50, mounted on a vertical shaft 51, driven by a motor 52, is placed in contact therewith. The contact 41 is in continuous contact and grinding continues until the specified displacement of the inner ring face with respect to the outer ring face is reached as shown on the scale of the indicating meter 47. The mass 48 used here for illustration to supply both the rotational energy and the thrust loading, may be replaced by any suitable powered means for producing these effects.

It will be noted that any variation between the face of the inner ring and the inner ring raceway will be sensed by the grinding wheel and be automatically corrected. This variation is known to the industry as "parallelism of inner ring raceway to face" or "runout" of inner ring raceway to face. The indicating meter of course also shows this variation and simultaneously acts as an inspection for this important characteristic.

The apparatus and method for performing the DF preload grinding are shown in FIGS. 11 and 12. In this application, the face of the outer ring 11 is ground rather than the face of the inner ring 13. In FIG. 11, a precision stud supports 56 providing for three equally spaced contacts with the face of the inner ring is mounted horizontally on fixture 58. The OD of the stud closely conforms to the bore of the inner ring. Setting gage 59 simulating the combined weight of the bearing and specified load and carrying a precision flat under surface 60 is placed on the stud support. Contacting member 61 of a suitable pickup device coupled to a transducer senses the location of the precision flat at the location corresponding to the face of the outer ring to be ground of FIG. 12. The transducer 62 is an integral part of fixture 58. An indicating meter similar to that shown at 44 in FIG. 9, associated with the transducer, is adjusted to show a zero reading. This now establishes a reference plane for the bearing inner ring face at zero.

Referring now to FIG. 12, the inner race 13 of a bearing with a suitable removable rubber seal 64 is placed on the precision stud with the seal side down as shown. A thrust loading mass 68 designed to centrally load the outer ring is now placed in position on the upper face of the outer ring 11. This produces a displacement E of the outer ring face 21 with respect to the inner ring face 20. This displacement E is shown on the scale of the indicating meter. The mass 68 is now rotated and provides sufficient energy to rotate the outer ring and ball train so as to provide a continuous outer ring face when the rotating grinding wheel 69 is placed in contact. The contacting member 61 is in continuous contact and grinding continues until the specified displacement of the outer ring face with respect to the inner ring face is obtained as shown on the scale of the indicating meter. The mass 68 used here for illustration to supply both the rotational energy and the thrust loading, may be replaced by any suitable powered means for providing these effects.

It will also be noted here that any variation between the face of the outer ring and the outer ring raceway will be sensed by the grinding wheel and automatically corrected. The indicating meter also senses the variation of parallelism of outer ring raceway to face or "runout" and simultaneously acts as an inspection for this important characteristic.

FIG. 13 is a fragmentary view of the structure shown in FIG. 10, except that instead of the indicator 41 there is positioned an air jet 72 with a conduit 73 leading to an air supply and meter shown at 74. This is a conventional type of non-contacting probe wherein the nozzle opening 75 of the air jet is closely adjacent to the inner ring 13 before any stock has been removed. In such position only a very small quantity of air is allowed to escape from the nozzle. As grinding continues more air escapes as shown on the meter 74 and when the pointer 76 reaches the zero position, the work is finished. Any conventional means may be used for sensing the position of the lower face of the ring relative to the reference plane.

The assembled bearings, mounted on the shafts in DB, DF or DT relation in FIGS. 4, 7 and 8 are shown with seals in place. It will be understood that the customer specifies whether or not he desires seals in the finished bearings and that after the preload grinding operation described herein, the seals are removed from the assembled bearings for greasing and lubrication, after which, if seals are to be used, these seals are inserted at the specified ends of the bearings.

What I claim is:

1. The method of preload grinding of a ball bearing having inner and outer rings with a complement of balls between the rings, for duplex assembly while said bearing is in an assembled condition, which method comprises: establishing a reference measuring plane for a first face of a first one of said rings, positioning said first ring of the assembled bearing so that said first face coincides with said reference plane when a second one of said rings is loaded with a predetermined thrust loading force, said thrust loading force producing a movement of the adjacent face of the second ring relative to the plane of the face of first ring, rotating the thrust loaded second ring while the first ring is supported immovable, and simultaneously grinding and measuring the stock removed from said adjacent face of the second ring until the required instrusion, protrusion or flushness of said adjacent face of the second ring relative to said first face of the first ring is obtained which will give the bearing a specified preload when the faces of the duplex pair are mounted flush in relation.

2. The method defined in claim 1 wherein a dust seal is inserted between the assembled rings on the side to be ground as the first step in the method.

3. The method of preload grinding of a ball bearing having inner and outer rings with a complement of balls between the rings for duplex back-to-back assembly while said bearing is in an assembled condition, which method comprises: establishing a reference measuring plane for a first face of the outer ring, positioning the outer ring of the assembled bearing so that said first face coincides with said reference plane when the inner ring is loaded with a predetermined thrust loading force, said thrust loading force producing a movement of the adjacent face of the inner ring relative to said outer ring face, rotating the thrust loaded inner ring while the outer ring is supported immovable, and simultaneously grinding and measuring the stock removed from said adjacent face of the inner ring until the required instrusion, protrusion or flushness of said adjacent face of the inner ring relative to said first face of the outer ring is obtained which will give the bearing a specified preload when the faces of a duplex pair are mounted flush in back-to-back relation.

4. The method defined in claim 3 wherein a dust seal is inserted between the assembled rings on the side to be ground as the first step in the method.

5. The method of preload grinding of a ball bearing having inner and outer rings with a complement of balls between the rings for duplex face-to-face assembly while said bearing is in an assembled condition, which method comprises: establishing a reference measuring plane for a first face of the inner ring, positioning the inner ring of the assembled bearing so that said first face coincides with said reference plane when the outer ring is loaded with a predetermined thrust loading force, said thrust loading force producing a movement of the adjacent face of the outer ring relative to said first inner ring face, rotating the thrust loaded outer ring while the inner ring is supported immovable, and simultaneously grinding and measuring the stock removed from said adjacent face of the outer ring until the required instrusion, protrusion or flushness of said adjacent face of the outer ring relative to said first face of the inner ring is obtained which will give the bearing a specified preload when the faces of a duplex pair are mounted flush in face-to-face relation.

6. The method defined in claim 5 wherein a dust seal is inserted between the assembled rings on the side to be ground as the first step in the method.

References Cited

UNITED STATES PATENTS

| | | | |
|---|---|---|---|
| 1,722,494 | 7/1929 | Brunner | 51—291 |
| 1,997,903 | 4/1935 | Hackenthal | 51—291 |
| 2,034,507 | 3/1936 | Colson | 51—105 |
| 2,907,143 | 10/1959 | McNicoll | 51—291 X |
| 2,972,841 | 2/1961 | Anderson | 51—291 |
| 3,077,061 | 2/1963 | St. John | 51—105 |

LESTER M. SWINGLE, *Primary Examiner.*